INVENTORS
HEINRICH RUPP
ALBERT NORZ
BY Percy P. Lantzy
ATTORNEY

INVENTORS
HEINRICH RUPP
ALBERT NORZ
BY [signature]
ATTORNEY

United States Patent Office 3,398,400
Patented Aug. 20, 1968

3,398,400

METHOD AND ARRANGEMENT FOR TRANSMITTING AND RECEIVING DATA WITHOUT ERRORS

Heinrich Rupp, Stuttgart-Botnang, and Albert Norz, Stuttgart-Zuffenhausen, Germany, assignors to International Standard Electric Corporation, New York, N.Y., a corporation of Delaware Filed July 26, 1963, Ser. No. 297,785
Claims priority, application Germany, Aug. 2, 1962, St 19,560
1 Claim. (Cl. 340—146.1)

ABSTRACT OF THE DISCLOSURE

Error determinative data transmission is accomplished by the generation of a plurality of check elements from the information elements with one or more of the check elements being inverted. At the receiving end, selective inversion of check signals generated from the transmitted information and check elements allows detection of cyclic code synchronizing errors.

Figure 1:
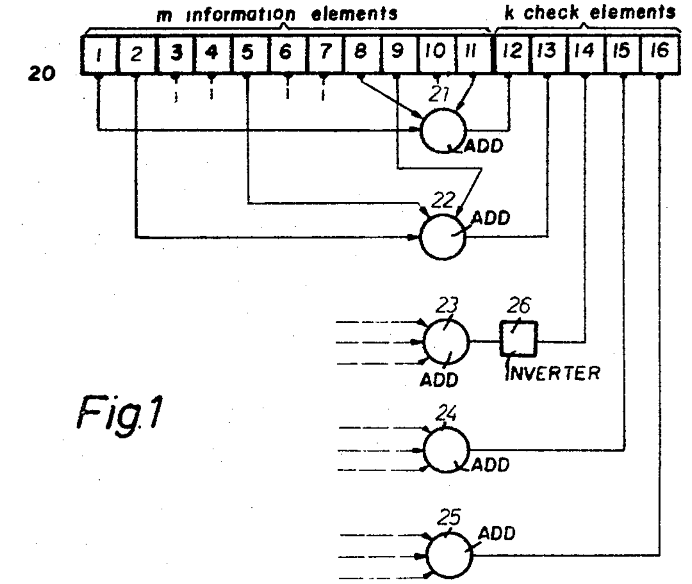

The present invention relates to a method and to an arrangement for effecting the error-free data transmission with the aid of binary group codes, in which several check elements are derived from the information elements by way of a parity check, and are transmitted as well. At the receiving end, by checking both the information and check elements, it is recognized whether errors have occurred during the transmission, so that, if necessary, there may be initiated a repetition of the erroneously transmitted character or characters respectively.

By the term "binary group codes" there are supposed to be understood such types of redundant codes in which the individual code words are obtained from one another by a mod 2 addition of two or more code words.

Methods of effecting an error-free data transmission with the aid of binary group codes are already known, in which from the information elements which are stored e.g. in a parallel fashion in a storage device, there are derived several check elements in the course of a parity check. In this case it is previously determined whether by the check element the total digits of a number (parity) is completed towards "0" (even) or towards "1" (odd). At the receiving end it is then checked with the aid of the parity check applied to the corresponding information and check elements, whether errors have occurred during the transmission, i.e. quite depending on the previous determination, the checking is either directed to "0" or "1."

With respect to one particular kind of group codes, the cyclic codes, it is known to ascertain the check elements at the transmitting end by way of dividing the information elements by a certain divisor within a feedback shift register. At the receiving end the information and check elements are fed to feedback shift register which is of the same or a similar design, and which performs the same division by the predetermined divisor. The criterion indicating a correct transmission, exists whenever the division value remaining in the shift register, is in all cases equal to zero.

All of the aforementioned methods, however, have the disadvantage that with respect to certain information symbols, synchronizing errors are not recognized, and may thus be the cause of unwanted errors. In the case of group codes there exist information symbols, such as the zero word, in which a shifting to the right or the left again results in an admissible information symbol. This is particularly evident in the case of cyclic codes, where each cyclically shifted code word is again an admissible code word.

If, in one information symbol, all elements are zero, then the synchronism between the two stations is likely to be lost during the transmission intervals.

For this reason it is one object of the present invention to provide a method and an arrangement for effecting the error-free data transmission, in which synchronizing errors, in addition to other transmission errors, can be recognized without requiring a substantial additional expenditure on either redundancy or circuit elements.

The method according to the invention is characterised by the fact that, at the transmitting end, the total of the digits of the number (parity) of information elements is completed in accordance with a given system, either towards "0" or "1," and that at the receiving end, the associated information and check elements are checked in accordance with the system provided at the transmitting end, again with regard to "0" or "1" respectively.

One particularly advantageous method for the use with binary cyclic codes is characterised by the fact that, at the transmitting end, the check elements are ascertained by adding the previously determined number to the division remainder resulting from the division of the information elements by a certain divisor, that at the receiving end, both the information and check elements are divided by the said certain divisor, and that it is checked whether the previously determined number will remain as the division remainder.

An arrangement for carrying out the method with the aid of binary cyclic codes is characterised by the fact that at both the transmitting and the receiving end, for dividing the corresponding elements by the predetermined divisor, there is each time used a feedback shift register.

The previously determined scheme or system may either be applied, via corresponding inputs, to the individual shift-register stages, subsequent to the determination of the division remainder at the transmitting end, or else a combination assigned to the previously determined scheme or system is written into the shaft register prior to the process of division.

Figure 2:
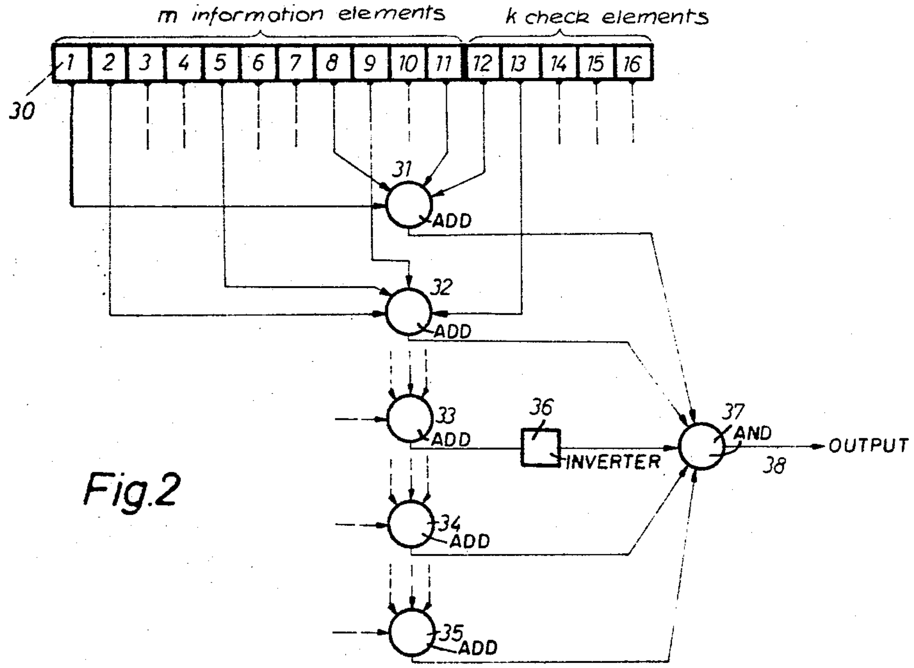
Figure 3:
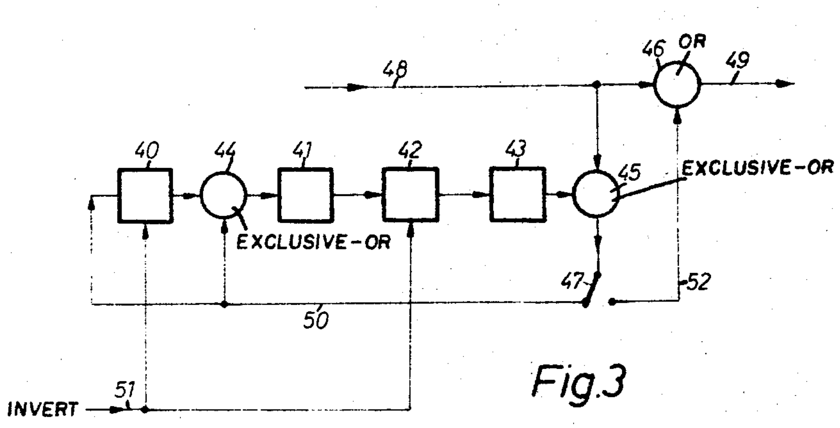
Figure 4:
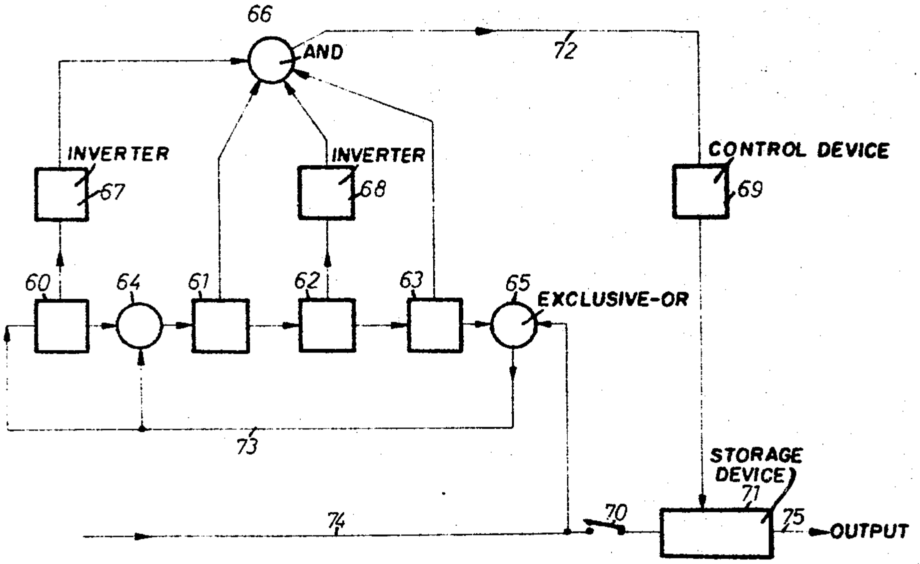

The invention will now be explained in detail with reference to FIGS. 1–4 of the accompanying drawings, in which:

FIG. 1 shows the partial circuit diagram relating to the transmitting end of an inventive type of circuit arrangement for group codes, FIG. 2 shows a partial circuit diagram relating to the receiving end of an inventive type of circuit arrangement for group codes, FIG. 3 shows a partial circuit diagram relating to the transmitting end of an inventive type of circuit arrangement for cyclic codes, and FIG. 4 shows a partial circuit diagram relating to the receiving end of an inventive type of circuit arrangement for cyclic codes.

The embodiment shown in FIGS. 1 and 2 is based on a group code of $m=11$ information elements and $k=5$ check elements. To the $m$ information elements there are assigned the cells 1–11, and to the $k$ check elements there are assigned the cells 12–16 of the storages 20 (transmitting end) or 30 (receiving end). These storage devices 20 and 30 are provided in order that the information and check elements are available in parallel fashion. If these elements are already applied in a parallel fashion, then the storage devices may be omitted.

From the contents of the individual storage cells 1–11, and via the five mod-2 adders 21–25, there are formed five check elements at the transmitting end (FIG. 1). From the corresponding information elements, the mod-2 adders form the sum of all digits (parity): mod-2, in other words, these results complete the sum of all digits (parity) of the information elements towards "0." The adders 21 and 22 interlace the information elements 1, 8 and 11 or 2, 5 and 9 to form the check elements 12 or 13 respectively.

The thus formed $k$ check elements were attached to the $m$ information elements and transmitted as well in the conventional types of arrangements. At the receiving end, via $k$ mod-2 adders, there was then performed a parity check of the corresponding information elements with the check elements assigned thereto, and it was checked whether in all $k$ cases, the mod-2 sum was equal to 0. In this way it was possible to detect transmission errors up to a certain number of errors. However, if displacements of the information symbol occurred towards the right or the left because of synchronization errors, this was not recognizable in all cases where a shifting or displacement again resulted in a new admissible information symbol.

It was from this consideration that the method or respectively the arrangement according to the invention has resulted. The check elements coming from the mod-2 adders 21 to 25 are not all fed directly to the storage cells 12 to 16, from where they are transmitted, but the check element from the adder 23 is inverted by an inverter stage 26, and is only thereafter applied to its associated storage cell 14. The check elements 12, 13, 15 and 16 thus complete the mod-2 sum of the information elements associated thereto, towards "0," and the check element 14 completes the mod-2 sum of the information elements associated thereto, towards "1."

The fact that only the check element 14 is inverted, is given for purpose of example. Alternatively several check elements may be inverted. Which and how many check elements are inverted is dependent upon the employed character length. In principle, it is possible to fix any arbitrary pattern.

The $m$ information and $k$ check elements as stored in the storage device 20, are now applied, via the transmission path, to the storage device 30 at the receiving end (FIG. 2). The storage cells 1–11 of the information elements, and 12–16 of the check elements are connected to the input leads of the five mod-2 adders 31–35. These serve to form, from the information elements and the associated check elements, the mod-2 sum. For example, in accordance with the interlacing of the information elements at the transmitting end, the information elements 1, 8 and 11 are interlaced with the check element 12, and the information elements 2, 5 and 9 are interlaced with the check element 13 via the mod-2 adders 31 or 32 respectively.

The outputs of the mod-2 adders 31, 32, 34 and 35 are connected directly, and the output of the adders 33 is connected via an inverter stage 36 to the inputs of the AND-circuit 37. This means to imply that in accordance with the scheme or the system of completion of the sum of all digits (parity) of the information elements by the check elements toward "0" (directly) or respectively towards "1" (via the inverter stage 26) the parity check at the receiving end is likewise carried out in accordance with this predetermined scheme or system to "0" (adders 31, 32, 34, 35 directly) or to "1" (adder 33 and inverter stage 36) respectively.

The AND-circuit 37 is so designed that it will only transmit the output criterion for an error-free transmission to the output lead 38, when all of the input leads conduct the signal "0." In cases where this output criterion is not given, because not all of the inputs conduct the signal "0," then this means to imply either a transmission error by which one or more elements have been inverted, or that there has occurred a displacement or shifting of the elements due to a synchronizing error. Accordingly, the AND-circuit 37 provides an error-indicating signal and the one or more disturbed characters are repeated in the known manner.

Via corresponding (not shown) control means, the output criterion indicating an error-free transmission, effects that the information elements, as stored in the storage cells 1–11 of the storage device 30, are fed out for the purpose of being further processed.

FIGS. 3 and 4 show an embodiment according to the invention with respect to cyclic codes. Cyclic codes belong to the group codes and permit a simple ascertainment of the check elements from among the information elements with the aid of a feedback shift register. Due to the fact that in the case of cyclic codes, each cyclically shifted code word again results in a new admissible code word, synchronizing errors are particularly critical.

FIG. 3 shows the individual stages 40, 41, 42 and 43 of a feedback shift register of the type known per se, for deriving check elements from the information elements. According to the invention however the stages 40 and 42 are capable of being set from the outside via the line 51. The shift register comprises as many stages as check elements ($k$ elements) contained in the cyclic code to be produced.

Via the line or lead 48 the unchecked code word consisting of $m$-positions or elements, is applied on one hand via the OR-circuit 46, to the transmitting line 49, from where it is transmitted, or, on the other hand, via the exclusive OR-circuit (mod-2 adder) 45 and the switch 47 which is in its left-hand position, to the input of the shift-register stage 40 and the input of the exclusive OR-circuit 44.

In the hitherto conventional types of circuit arrangements there was now effected, after all of the $m$ information elements had been transmitted on one hand via the line 49 and, on the other hand, had been shifted through the shift register, switch 47 was placed to the right. By the clock-pulse control of the shift register which, for reasons of clarity, has been omitted herein, the $k$ check elements as stored in the individual shift-register stages, were shifted out. These check elements were applied, via the exclusive OR-circuit 45, the line 52 and the OR-circuit 46, to the line 49, and were thus attached as $k$ check elements to the already transmitted $m$ information elements.

The $k$ check elements are produced in the conventional manner through the feedback paths while shifting the $m$ information elements through the shift register. This process corresponds to the parity check performed in the coding equipment for group codes.

According to the invention the partial parities (partial sum of all digits) as formed subsequent to the shifting-through of the $m$ information elements, and stored in the individual stages of the shift registers, are not fed directly to the line 49. Instead certain elements are inverted prior to the transmission. To this end, for example, one pulse is fed to the stages 40 and 42 via the line after the $m$th clock-pulse, that is, after all information elements have been shifted through. This pulse serves to invert the storage content of these stages, in other words, a "0" is inverted to "1" or vice versa. Provisions have also been made for preventing a transmission (or transfer) pulse from being applied to the following stages on account of the switchover (reversal) of these stages 40 and 42.

The inverting pulse on line 51 effects that the parities of the corresponding information elements, by the check elements assigned to the stages 40 and 42, are completed to "1," and the check elements assigned to the stages 41 and 43, are completed to "0." This check system, according to which the check elements are inverted, may be chosen at will, as in the arrangement according to FIGS. 1 and 2.

Instead of inverting the check elements subsequent to the shifting-through of the $m$ information elements, the individual stages of the shift registers may be set in accordance with the chosen check system, prior to the shifting-through of the information elements. Prior to each new encoding process, not all of the shift-register stages are set as usual, to "0," but certain stages are set to "1." This presetting pattern is not identical to the chosen check system of the parity check, but must be chosen separately for each check system.

At the receiving end (FIG. 4) the $m$ information elements are shifted, via the line 74 and the closed switch 70, into the intermediate storage device 71 consisting of $m$ positions. The transfer of the storage content to the output line 75 is blocked via a control device 69. After the $m$ elements have been stored, switch 70 is opened for blocking the $k$ check elements. The $m+k$ elements are fed simultaneously via the exclusive OR-circuit 65, to the feedback shift register comprising the stages 60, 61, 62 and 63. This shift register is designed at the receiving end in the same manner as the one at the transmitting end; however, it may also be differently subdivided. After the $m+k$ elements have been shifted through the $k$ stages of the shift register, the partial parities of the individual information and check elements are stored in the individual stages.

In the methods as known hitherto, the partial parity of the information elements were uniformly completed at the transmitting end to "0." Accordingly, when checking at the receiving end, the individual parities also had to show the result "0." Hence, the result "0" had to occur in all stages subsequently to the shifting-through of the $m+k$ elements. This was checked by an AND-circuit connected to the outputs of the individual stages, which only provided the criterion "transfer without errors" if a "0" was available at all inputs.

In the arangement according to the invention the individual stages of the shift register are checked with respect to the content of the given combination. This means to imply that the stages 60 and 62 are checked with respect to "1" in accordance with the inverted stages 40 and 42 (transmitting end), and the stages 61 and 63 to "0" in accordance with the non-inverted stages 41 and 43 (transmitting end). This checking is effected with the aid of an AND-circuit 66 whose inputs are connected directly to the stages 61 and 63 and, via inverter stages 67 and 68, to the stages 60 and 62.

If the check shows the existence of the given pattern (in this case 1010), then an output criterion indicating the correct transmissiion, is transferred by the AND-circuit

66, via the line, to the control circuit 69 which then causes the transfer (readout) of the $m$ information elements of the storage device 71, to the output line 75.

If the stages 60, 61, 62 and 63 of the shift register consist of flip-flop stages or other types of stages comprising opposite-phase outputs, then the inverter stages 67 and 68 may be omitted, because then the corresponding inputs of the AND-circuit 66 may be connected to the inverse outputs of the stages 60 and 62.

While we have described above the principles of our invention in connection with specific apparatus, it is to be clearly understood that this description is made only by way of example and not as a limitation to the scope of our invention as set forth in the objects thereof and in the accompanying claim.

What we claim is:

1. An error detecting transmission system comprising a transmitting storage device for temporarily storing a plurality of information elements and check elements, a plurality of adder means each responsive to at least some of the information elements for generating a plurality of check elements, means for inverting at least one check element and storing all of the check elements in the transmitting storage device, a receiving storage device operatively connected to the transmitting storage device to receive signals representative of the transmitting storage device information and check elements, a plurality of adder means associated with the receiving storage device for generating received check signals from received information and check elements, means for inverting at least one of the said received check signals, and output control means for indicating the presence or absence of an error.

References Cited

UNITED STATES PATENTS 3,227,999 1/1966 Hagelbarger ------- 340—146.1

MALCOLM A. MORRISON, *Primary Examiner.*

C. E. ATKINSON, *Assistant Examiner.*